(12) United States Patent
Paczkowski

(10) Patent No.: US 11,809,562 B1
(45) Date of Patent: Nov. 7, 2023

(54) OPERATING SYSTEM KERNEL ANALYSIS TO DETECT A CYBER ATTACK

(71) Applicant: T-Mobile Innovations LLC, Overland Park, KS (US)

(72) Inventor: Lyle W. Paczkowski, Mission Hills, KS (US)

(73) Assignee: T-Mobile Innovations LLC, Overland Park, KS (US)

( * ) Notice: Subject to any disclaimer, the term of this patent is extended or adjusted under 35 U.S.C. 154(b) by 227 days.

(21) Appl. No.: 17/362,205

(22) Filed: Jun. 29, 2021

(51) Int. Cl.
*G06F 21/00* (2013.01)
*G06F 21/56* (2013.01)

(52) U.S. Cl.
CPC ...... *G06F 21/566* (2013.01); *G06F 2221/033* (2013.01)

(58) Field of Classification Search
CPC ............ G06F 2221/033; G06F 21/566; G06F 2221/034; G06F 21/577; G06F 21/50; G06F 11/3051; H04L 9/0643
See application file for complete search history.

(56) References Cited

U.S. PATENT DOCUMENTS

| 10,474,813 B1 * | 11/2019 | Ismael | G06F 21/54 |
| 2016/0328561 A1 * | 11/2016 | Tamir | G06F 21/552 |

\* cited by examiner

*Primary Examiner* — Tri M Tran

(57) ABSTRACT

A method of detecting unauthorized code modification within a kernel of a computer system comprising performing a first measurement of the kernel in a kernel location, by a measurement tool executing on the computer system and storing the first measurement in a storage location. Initiating the measurement tool in response to a trigger event to perform a second measurement of the kernel. Comparing the second measurement, of the kernel, to a first measurement, of the kernel, by the measurement tool to determine a comparison value. Initiating a monitoring tool, executing on the computer system, in response to the comparison value exceeding a threshold value.

6 Claims, 13 Drawing Sheets

OPERATING SYSTEM KERNEL ANALYSIS TO DETECT A CYBER ATTACK

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A basic computer system comprises computer hardware, an operating system, and one or more application programs. The computer hardware includes a processor, a memory, a storage device, and one or more system buses that facilitate communication among the various components. The operating system is an interface between applications and the hardware layer of the computer system. The operating system includes various routines that manage the physical components of the computer system and their use by applications.

Computer systems are known to have vulnerabilities to various kinds of cyber-attacks targeting the software of the operating system or the application programs. Attacks can be instituted and delivered over network connections, such as the Internet, but also may come directly from someone with immediate access to a computer system. Computer viruses, worms, and trojan horses are all examples of different forms of cyber-attack. Cyber-attacks are generally implemented by installing unauthorized or malicious code into the programs and causing execution of the foreign code. For example, exploits may be created to force an application to execute code after an exploit has been triggered. The code may be considered a payload which is often prepared in memory before being triggered by the exploit.

Ransomware is one type of cyber-attack that targets the core control, e.g., OS Kernel, virtualization, and one or more hardware interfaces, to lock out the user, or the owner, from control of the computer system until a ransom is paid, often in a virtual currency. One type of ransomware can target the core control to prevent the user from accessing the computer system. Another type of ransomware can encrypt the files of the user to prevent access. Still another type of ransomware can threaten to publish or to erase the files of the user. The cyber-criminal may provide instructions on how to receive an encryption key to unlock or decrypt the system or files.

SUMMARY

In an embodiment, a method of detecting an initiation of malware code within a memory stack of non-transitory memory of a computer system is disclosed. The method comprises performing a first measurement of a process in a memory stack location, by a measurement tool executing on the computer system. The measurement tool stores the first measurement in a storage location. The measurement tool initiates in response to a trigger event, performs a second measurement of the process, compares the second measurement to the first measurement to determine a comparison value, and initiates a monitoring tool, executing on the computer system, in response to the comparison value exceeding a threshold value.

In another embodiment, a method of detecting unauthorized code modification within a kernel of a computer system is described. The method comprises performing a first measurement of the kernel in a kernel location, by a measurement tool executing on the computer system, and storing the first measurement, by the measurement tool, in a storage location. The method further comprises initiating the measurement tool in response to a trigger event, performing a second measurement of the kernel, comparing the second measurement to the first measurement to determine a comparison value, and initiating a monitoring tool, executing on the computer system, in response to the comparison value exceeding a threshold value.

In yet another embodiment, a method of detecting unauthorized code modification within a kernel of a computer system is described. The method comprises performing a first measurement of the monitoring tool in a memory stack location, by a measurement tool executing on the computer system and storing the first measurement in a storage location. The method further comprises initiating the measurement tool in response to a trigger event, performing a second measurement of the monitoring tool, by the measurement tool, comparing the second measurement to the first measurement, by the measurement tool, to determine a comparison value, and initiating a second monitoring tool, executing on the computer system, in response to the comparison value exceeding a threshold value.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
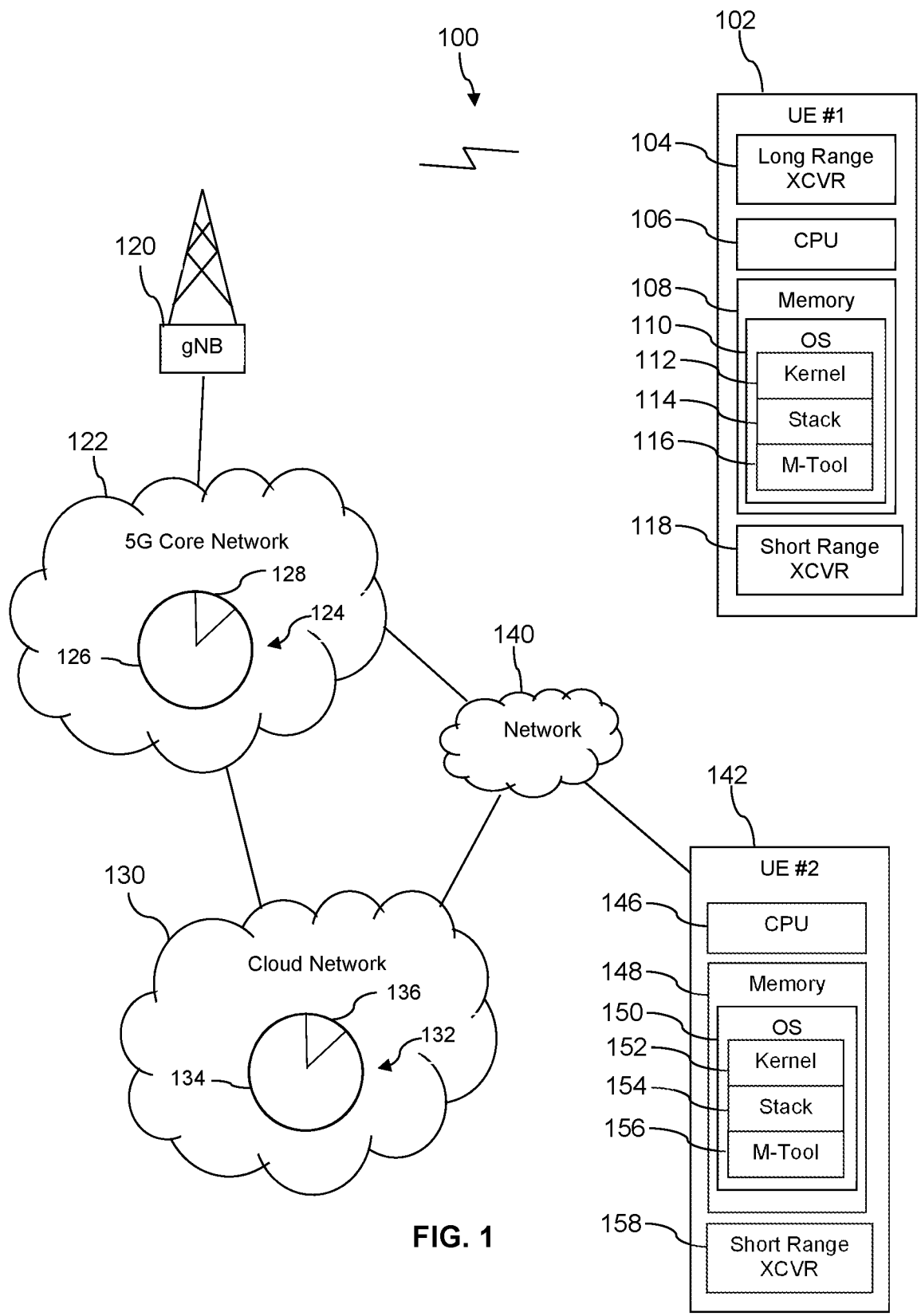
FIG. 1 is a block diagram of a system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Virus protection can protect a computer system by monitoring the applications and hardware for signatures and for behaviors. Signature based monitoring will typically scan for indications, also called signatures or fingerprints, of malware. These signatures can be a file name, a file size, or a hash of a file. The monitoring software can compare this signature to a database or list of known signatures. Behavior based monitoring will typically assess a process's intended action before it can execute that behavior. A process's behavior, or intent, is analyzed for suspicious activities that are clearly abnormal or unauthorized, such as disabling security controls, installing rootkits, and registering for autostart. Some types of monitoring can include both signature based monitoring and behavior based monitoring. By targeting the core control with the cyber-attack, the cyber-criminal attempts to emulate a routine process of the OS Kernel to bypass all types of virus protection.

Cyber-attacks have evolved from targeting applications to targeting the core control, e.g., OS Kernel, virtualization, and the hardware interfaces of the computer system, to gain complete control of the system. In some cases, the malware replaces the original kernel with a corrupted copy. In some cases, the malware spawns one or more processes to disable protection or perform a malicious operation. In some cases, the malware spawns a new process that replaces the monitoring tool with a non-functional monitoring tool. New methods of monitoring the computer system against cyber-attacks could provide beneficial results in addressing ever new challenges of providing cyber security in computer systems.

One solution can use a measurement tool to detect changes to the kernel, the memory stack, or the monitoring tool. The measurement tool examines or measures the state of the kernel or other code at different times to determine if a change has been made. Unlike a monitoring tool, the measurement tool does not compare to a predetermined list or behavior type. The measurement tool only measures the kernel or other code. In an embodiment, the measurement tool can gather a first measurement of the kernel by recording the binary of the kernel to a storage location. The first measurement can be made when the computer system is first initialized. The first measurement and every subsequent measurement can be stored in the memory stack or in a storage device. The measurement tool can gather a second measurement in response to a trigger event, for example, a designated time period. The measurement tool can compare the first measurement to the second measure and activate a monitoring tool if the comparison exceeds a threshold value.

Malicious code can be delivered to a computer system by a user connecting a corrupted device, through an email with an infected file, through a malicious website, transferred through a network from another computer system, within a software update, or by mimicking a software update. The malicious code may remain dormant for hours, days, weeks, or months. Consider the example of malicious code being delivered to the computer system within a corrupted software update. The malicious code may remain dormant until the computer system is restarted to apply the update. The malicious code can circumvent the system monitoring tools because the malicious code appears as a legitimate software update. The malicious code may activate during the normal update process or may remain dormant until a second update is applied, until a later date, or until after normal operating hours so the user is unaware of the system resources being used. The malicious code can activate to modify the kernel of the computer system to spawn additional processes within the memory stack to gain control of the computer system. The system monitoring tools may not activate because the kernel appears to be operating normally. New methods of monitoring the computer system against cyber-attacks could provide beneficial results in addressing new challenges of malicious code targeting the kernel of the computer system.

In an embodiment, a measurement tool measures the kernel at a first timestamp to gather a first measurement. The first measurement is preferably when the system is first initialized. The measurement tool can obtain a first measurement of the kernel by recording the binary of the kernel to a storage location. The measurement tool can gather a second measurement after a predetermined period of time or in response to a trigger event, for example, a software update. The measurement tool can compare the second measurement to the first measurement, preferably the initial measurement, and activate a monitoring tool if the comparison exceeds a threshold value. The monitoring tool can compare the current processes being executed in the memory stack to a black list signature file and stop the execution of identified processes. The monitoring tool can alert the user of a banned process that is executing on the computer. The monitoring tool may hibernate one or more active processes, for example, may hibernate a hard drive to prevent encryption of the hard drive. The measurement tool can prevent corruption of the kernel by determining a change in the binary as opposed to signature based or behavior based monitoring.

Malicious code may target one or more processes executing within a memory stack. Consider the example of malicious code replacing one or more known processes with modified code to gain control of the computer system. The system monitoring tools may not activate because the one or more processes within the memory stack appear to be operating normally. The malicious code may have disabled the monitoring tool or may have placed the processes in a cloned environment that the monitoring tools cannot observe. New methods of monitoring current processes executing in the memory stack to could provide beneficial results in addressing new challenges with malicious code. In an embodiment, a measurement tool measures the processes within the memory stack at a first timestamp to gather a first measurement. The first measurement is performed preferably when the system is first initialized. The measurement tool can obtain a first measurement of the processes by recording the binary of each process within each location of the memory stack to a storage location. The measurement tool can gather a second measurement after a predetermined period of time or in response to a trigger event, for example, a software update. The measurement tool can compare the second measurement to the first measurement, preferably the initial measurement, and activate a monitoring tool if the comparison exceeds a threshold value. The monitoring tool can compare the current processes being executed in the memory stack to a black list signature file and stop the execution of identified processes. The monitoring tool can alert the user of execution of a banned process on the computer. The monitoring tool may hibernate one or more active processes, for example, may hibernate a hard drive to prevent encryption of the hard drive. The measurement tool can prevent corruption of the processes executing in the memory stack by determining a change in a binary of each memory stack location as opposed to signature based or behavior based monitoring.

Malicious code may target the monitoring tool executing within a location in the memory stack. Consider the example of malicious code replacing the monitoring tool with a corrupted monitoring tool so that one or more corrupted processes can be spawned. A corrupted monitoring tool may not notify the user or be activated by a corrupted process within the memory stack. The malicious code may have disabled the monitoring tool or may have replaced the monitoring tool with a non-functioning monitoring tool. New methods of monitoring the computer system against cyber-attacks could provide beneficial results in addressing new challenges of malicious code targeting one or more monitoring tools of the computer system. In an embodiment, a measurement tool measures the monitoring tool within the memory stack at a first timestamp to gather a first measurement. The first measurement is preferably when the system is first initialized. The measurement tool can obtain a first measurement of the monitoring tool by recording the binary of the monitoring tool within the memory stack to a storage location. The measurement tool can gather a second measurement after a predetermined period of time or in response to a trigger event, for example, a software update. The measurement tool can compare the second measurement to the first measurement, preferably the initial measurement, and activate a second monitoring tool if the comparison exceeds a threshold value. The second monitoring tool can compare the current processes being executed in the memory stack to a black list signature file and stop the execution of identified processes. The monitoring tool can alert the user of the modified monitoring tool. The second monitoring tool may hibernate one or more active processes, for example, may hibernate a hard drive to prevent encryption of the hard drive. The measurement tool can prevent corruption of the monitoring tool executing in the memory stack by determining a change in a binary of the monitoring tool within the stack location as opposed to signature based or behavior based monitoring.

Turning now to FIG. 1, a mobile communication system 100 is described. In an embodiment, the mobile communication system 100 comprises a first communication device (user equipment #1, UE 102), an access node 120, a 5G core network 122, a network 140, and a remote computer (user equipment #2, UE 142). The UE 102 is communicatively connected to a mobile carrier that comprises a long-range radio transceiver 104, a processor 106, non-transitory memory 108 with an operation system (OS) 110, and a short range radio transceiver 118. The OS 110, executing within the non-transitory memory 108, comprises a kernel 112, a memory stack 114, and a measurement tool 116. Although the memory stack 114 is illustrated as a single location, it is understood that the memory stack 114 may comprise a plurality of locations. The UE 102 may be a computing device such as a cell phone, a smartphone, a wearable computer, a smartwatch, a headset computer, a laptop computer, a tablet computer, or a notebook computer. The UE 102 may be a computer system with a processor, memory, data storage, and input devices, as will be described further hereinafter. The UE 102 may be a server computer. A UE 102 may be a virtual home assistant that provides an interactive service such as a smart speaker, a personal digital assistant, a home video conferencing device, or a home monitoring device. A UE 102 may be a gaming device such as a virtual reality headset, immersive reality headset, or a gaming platform. A UE 102 may be an IoT device such as an appliance, a home monitoring device, a home security device, or a home access device. A UE 102 may be a medical device such as a medical monitoring device, a wearable device, a video access device, or a home testing device. A UE 102 may be an interactive robot device such as a remote surgical robot. A UE 102 may be an autonomous vehicle such as a self-driving vehicle without a driver, a driver assisted, an application that maintains the vehicle on the roadway with no driver interaction, or a driver assist application that adds information, alerts, and some automated operations such as emergency braking.

The access node 120 may also be referred to as a cellular site, cell tower, cell site, or, with 5G technology, a gigabit Node B. The access node 120 provides wireless communication links to the UE 102 according to a 5G, a long term evolution (LTE), a code division multiple access (CDMA), or a global system for mobile communications (GSM) wireless telecommunication protocol. Alternatively, the access node 120 can be a micro data center (MDC node) with a virtual network and one of more node applications. The 5G network can include MDC nodes in place of access node 120 to accommodate a high density of communication traffic or the density of customer devices. The virtual network can be proximate and communicatively connected to the access node 120. The virtual network may include the standard servers, off-the-self switches, and storage devices to support a virtual network functions (VNF). The VNF and node application are described in more detail, further hereinafter.

The UE 102 may establish a wireless link with the mobile carrier network (e.g., 5G core network 122) with a long-range radio transceiver 104 to receive data, communications, and, in some cases, voice and/or video communications. The UE 102 may also include a display, an input device (e.g., touchscreen display, keyboard, etc.), a camera (e.g., video, photograph, etc.), a speaker for audio, or a microphone for audio input by a user. The short range radio transceiver 118 may establish wireless communication with Bluetooth, WiFi, or other low power wireless signals such as ZigBee, Z-Wave, 6LoWPan, Thread, and WiFi-ah. The long-range radio transceiver 104 may be able to establish wireless communication with the access node 120 based on a 5G, LTE, CDMA, or GSM telecommunications protocol. The UE 102 may be able to support two or more different wireless telecommunication protocols and, accordingly, may be referred to in some contexts as a multi-protocol device. The UE 102 may communicate with another UE via the wireless link provided by the access node 120 and via wired links provided by 5G core network 122, and the network 140. Although UE 102 is illustrated as a single device, UE 102 may be a system of devices. For example, UE 102 may include sensors that are communicatively coupled to UE 102, such as a heart rate monitor that is communicatively connected to the short range radio transceiver 118. Another example may be an immersive gaming device with sensors, for example, a hand held input (e.g., a lightsaber), communicatively connected to the short range radio transceiver 118 of the UE 102. The system of devices may include any combination of one or more sensors as a separate device, the long-range radio transceiver 104 as a separate device, the short range radio transceiver 118 as a separate device that is communicatively coupled to the UE 102.

The 5G core network 122 can be communicatively coupled to the access node 120 and provide a mobile communication network via the access node 120. The 5G core network 122 can include a virtual network in the form of a cloud computing platform. The cloud computing platform can create a virtual network environment from standard hardware such as servers, switches, and storage. The total volume of computing availability 124 of the 5G core network 122 is illustrated by a pie chart with a portion illustrated as a network slice 128 and the remaining computing availability 126. The network slice 128 represents the computing volume available for storage or processing of data. The cloud computing environment is described in more detail further hereinafter. Although the 5G core network 122 is shown communicatively coupled to the access node 120, it is understood that the 5G core network 122 may be communicatively coupled to a plurality of access nodes (e.g., 122), one or more MDC nodes, or a 5G edge site. The 5G edge site may also be referred to as a regional data center (RDC) and can include a virtual network in the form of a cloud computing platform. The 5G core network 122 may receive all or a portion of the voice and data communications via 5G edge site, MDC node, and access nodes (e.g., 122). The 5G core network 122 may process all or a portion of the voice and data communications as will be described further hereinafter. Although the virtual network is described as created from a cloud computing network, it is understood that the virtual network can be formed from a network function virtualization (NFV). The NFV can create a virtual network environment from standard hardware such as servers, switches, and storage. The NFV is more fully described by ETSI GS NFV 002 v1.2.1 (2014-12) described in more detail, further hereinafter.

A cloud network 130 can be communicatively coupled to the 5G core network 122. The cloud computing platform can create a virtual network environment from standard hardware such as servers, switches, and storage. The total volume of computing availability 132 of the cloud network 130 is illustrated by a pie chart with a portion illustrated as a network slice 136 and the remaining computing availability 134. The network slice 136 represents the computing volume available for storage or transfer of data. The cloud computing environment is described in more detail, further hereinafter. Although the cloud network 130 is shown communicatively coupled to the 5G core network 122, it is understood that the cloud network 130 may be communicatively coupled to one or more MDC nodes or 5G edge site. Although the virtual network is described as created from a cloud computing network, it is understood that the virtual network can be formed from a network function virtualization (NFV). The NFV can create a virtual network environment from standard hardware such as servers, switches, and storage.

The network 140 may be one or more private networks, one or more public networks (e.g., the Internet), or a combination thereof. The network 140 can be communicatively coupled to the 5G core network 122 and the cloud network 130.

A second communication device (user equipment #2, UE #2 142) is communicatively connected to a mobile carrier via network 140. The UE #2 142 comprises a processor 146, non-transitory memory 148 with an operation system (OS) 150, and a short range radio transceiver 158. The OS 150, executing within the non-transitory memory 148, comprises a kernel 152, a memory stack 154, and a measurement tool 156. Although the memory stack 154 is illustrated as a single location, it is understood that the memory stack 154 may comprise a plurality of locations. Although the UE #2 142 is illustrated communicatively connected to network 140, it is understood that UE #2 142 may be connected via short range radio transceiver 158 and an access point (e.g., wireless modem/router). The UE #2 142 may be a computing device such as a home computer, a workstation, a desktop computer, a laptop computer, a tablet computer, or a notebook computer. The UE 102 may be a computer system with a processor, memory, data storage, and input devices, as will be described further hereinafter.

UE 102 may be a new device that the user initializes for the use with the mobile carrier. The initialization process may begin with the user starting the device and setting up the user account. The OS 110, executing in non-transitory memory 108, may start the measurement tool 116. The measurement tool 116 may access the memory stack 114 to find the first measurement of the kernel 152. If the first measurement is not located, the measurement tool 116 may measure the kernel 152 and save the measurement to a location in the memory stack 114. UE 102 may be communicatively connected to network 140 via the 5G core network 122. The user may download malware in the form of a file, an image, or an email from network 140. The malware file may activate immediately or after a time period. The measurement tool 116 may activate in response to a trigger event. The measurement tool 116 may record a second measurement of the kernel 112 and save the second measurement to a location within the memory stack 114. The measurement tool 116 may determine a comparison value based on the comparison of the second measurement to the first measurement. The measurement tool 116 may launch a monitoring tool if the comparison value exceeds a predetermined threshold as will be described further herein.

UE 142 may be a computer system that user operates from a home or from a work place that is communicatively connected to the network 140. The user may install a new OS 150 into the UE 142. The OS 150 may have an initialization process that begins with the user starting the device and setting up the user account. The OS 150, executing in non-transitory memory 148, may start the measurement tool 156. The measurement tool 156 may access the memory stack 154 to find the first measurement of the processes executing in the locations within the memory stack 154. If the first measurement is not located, the measurement tool 156 may measure the processes within the memory stack 154 and save the measurement to a location in the memory stack 154. The user may download malware in the form of a file, an image, or an email from network 140. The malware file may activate immediately or after a time period. The measurement tool 156 may activate in response to a trigger event. The measurement tool 156 may record a second measurement of the processes within the memory stack 154 and save the second measurement to a location within the memory stack 154. The measurement tool 156 may determine a comparison value based on the comparison of the second measurement to the first measurement. The measurement tool 156 may launch a monitoring tool if the comparison value exceeds a predetermined threshold.

Figure 2:
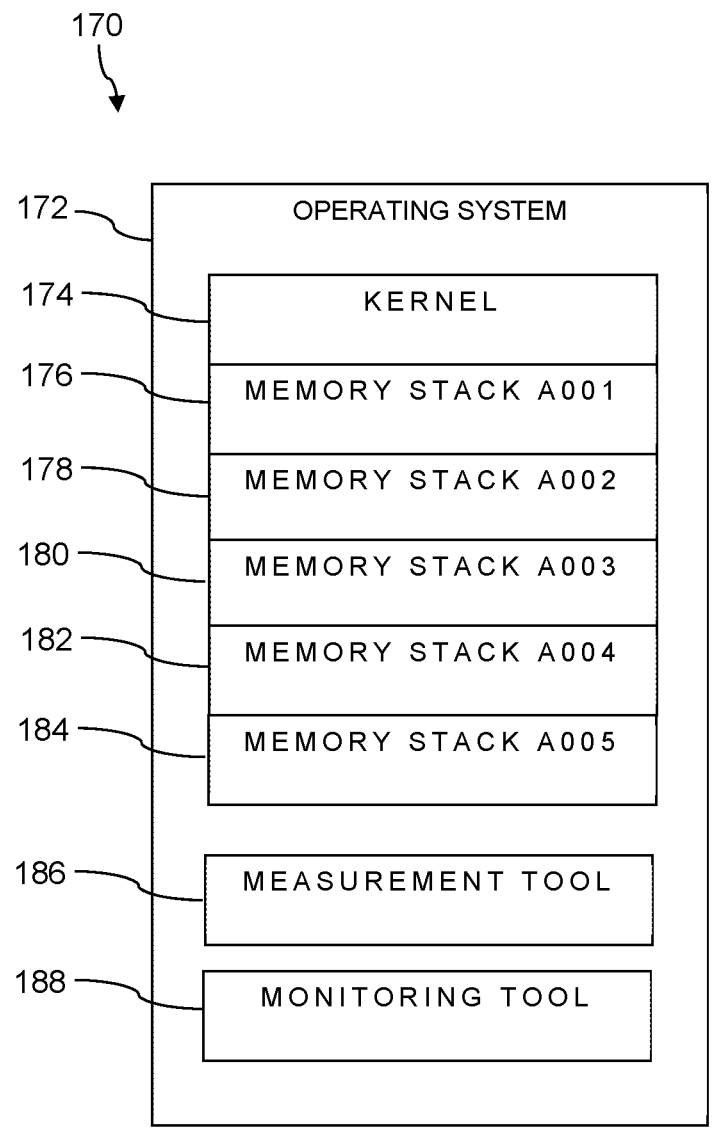
FIG. 2 a block diagram of a kernel and memory stack according to an embodiment of the disclosure.

The interaction of the measurement tool 156 and the monitoring tool within the non-transitory memory can be described in more detail. Turning now to FIG. 2, a method of detecting the initiation of malware code within non-transitory memory of a computer system is described. The computer system includes an operating system (OS) 172 executing in non-transitory memory 170 with a kernel 174 and a memory stack with a plurality of memory stack locations. The non-transitory memory 170 can be representative of non-transitory memory 108 in UE 102, non-transitory memory 148 in UE 142, non-transitory memory found in one or more servers within the 5G core network 122, or cloud network 130. The memory stack includes memory stack locations 176-188. It is understood that although memory stack locations 176-188 are illustrated, there may 1, 16, 32, 64, 128, 256, or any number of more memory stack locations available. In an embodiment, the OS 172, executing in non-transitory memory 170, may start the measurement tool 186.

The measurement tool 186 may access the memory stack locations 176-184 to find the first measurement of the kernel 174. If the first measurement is not located, the measurement tool 186 may measure the kernel 174 and save the measurement to a location in the memory stack, for example, memory stack location 176. The measurement of the kernel 174 may comprise recording the binary of the kernel 174 to a memory stack location, for example memory stack location 176. The measurement of the kernel 174 may comprise the steps of i) recording the binary of the kernel to a first memory stack location, for example memory stack location 176, ii) disassembling the binary of the kernel 174, and iii) recording the disassembled binary to a second memory stack location, for example, memory stack location 178. The disassembling of the binary may reverse engineer, or translate, the binary of the kernel into an assembly language source code. The measurement of the kernel 174 may comprise i) taking a hash of the binary of the kernel 174 and saving the hash to a memory stack location, for example memory stack location 176, ii) saving the binary of the kernel 174 to a storage location with the hash as the filename, or iii) combination thereof. The measurement tool may monitor for changes in i) system parameters, ii) network parameters, iii) server parameters, iv) performance metrics, v) bandwidth metrics, and vi) computer resource metrics.

The measurement tool 186 may be initiated, or started, in response to a trigger event, such as a predetermined time period, a randomized time period, a CPU utilization metric, data throughput metric, a change in network access method, e.g., wired access to wireless access, a change in Quality of Service (QoS), a request to change a user profile, a request to change a process location within the memory stack, or a request to change a network slice, e.g., network slice 128 in the 5G core network 122, or network slice 136 in the cloud network 130. The measurement tool 186 may perform a second measurement of the kernel 174 and save the measurement to a location in the memory stack, for example, memory stack location 180. The second measurement of the kernel 174 may comprise recording the binary of the kernel 174 to a memory stack location, for example memory stack location 180. The second measurement of the kernel 174 may comprise the steps of i) recording the binary of the kernel to a first memory stack location, for example memory stack location 180, ii) disassembling the binary of the kernel 174, and iii) recording the disassembled binary to a second memory stack location, for example, memory stack location 181.

The measurement tool 186 can compare the second measurement, located in memory stack location 180, to the first measurement, located in memory stack location 178, and activate a monitoring tool 188 if the comparison exceeds a threshold value. The monitoring tool 188 can compare the changes in the kernel 174 to a black list signature file. The monitoring tool 188 can compare the current processes being executed in a plurality of memory stack locations, e.g., 176-184, to a black list signature file and stop the execution of identified processes. The monitoring tool 188 can alert the user of a corrupted kernel or a banned process. The monitoring tool 188 may hibernate one or more active processes, for example, may hibernate a hard drive to prevent encryption of the hard drive. The term hibernate may mean to halting read access, halting write access, halting read-write access, ending execution of a process in a memory location, or halting access to a network function.

The measurement tool 186 may measure the processes executing in the memory stack locations for detection of malware code. In an embodiment, the OS 172, executing in non-transitory memory 170, may start the measurement tool 186. The measurement tool 186 may access the memory stack location 176-184 to find the first measurement of the processes executing in the memory stack location 176-184. If the first measurement is not located, the measurement tool 186 may measure the processes executing in the memory stack locations 176-184 and save the measurement to a location in the memory stack, for example, memory stack location 183.

The measurement of the process in memory stack location 176 may comprise the steps of i) recording the binary of the process to a first memory stack location, for example memory stack location 182, ii) disassembling the binary of the process, and iii) recording the disassembled binary to a second memory stack location, for example, memory stack location 184. The disassembling of the binary may reverse engineer, or translate, the binary of the kernel into an assembly language source code. The measurement tool 186 may monitor for changes in i) system parameters, ii) network parameters, iii) server parameters, iv) performance metrics, v) bandwidth metrics, and vi) computer resource metrics. The measurement tool 186 may be initiated, or started, in response to a trigger event, such as a predetermined time period, a randomized time period, a CPU utilization metric, data throughput metric, a change in network access method, e.g., wired access to wireless access, a change in Quality of Service (QoS), a request to change a user profile, a request to change a process location within the memory stack, or a request to change a network slice, e.g., network slice 128 in the 5G core network 122, or network slice 136 in the cloud network 130.

The measurement tool 186 may perform a second measurement of the process executing in memory stack location 176 and save the measurement to a location in the memory stack, for example, memory stack location 180. The second measurement of the process may follow the same steps previously described. The measurement tool 186 can compare the second measurement, located in memory stack location 176, to the first measurement, located in memory stack location 182, and activate a monitoring tool 188 if the comparison determines a difference and if the difference is greater than a threshold. The monitoring tool 188 can compare the changes in the process located in memory stack location 176 to a black list signature file. The monitoring tool 188 can compare the current processes being executed in a plurality of memory stack locations, e.g., 176-184, to a black list signature file and stop the execution of identified processes. The monitoring tool 188 can alert the user of a corrupted kernel or a banned process. The monitoring tool 188 may hibernate one or more active processes, for example, may hibernate a hard drive to prevent encryption of the hard drive.

The measurement tool 186 may measure the monitoring tool in a memory stack location for detection of malware code. In an embodiment, the OS 172, executing in non-transitory memory 170, may start the measurement tool 186. The measurement tool 186 may access the memory stack location 176-184 to find the first measurement of monitoring tool 188. If the first measurement is not located, the measurement tool 186 may measure the monitoring tool 188 and save the measurement to a location in the memory stack, for example, memory stack location 176. The measurement of the monitoring tool 188 may comprise the steps of i) recording the binary of the monitoring tool 188 to a first memory stack location, for example memory stack location 176, ii) disassembling the binary of the process, and iii) recording the disassembled binary to a second memory stack location, for example, memory stack location 178. The disassembling of the binary may reverse engineer, or translate, the binary of the kernel into an assembly language source code. The measurement tool may monitor for changes in i) system parameters, ii) network parameters, iii) server parameters, iv) performance metrics, v) bandwidth metrics, and vi) computer resource metrics. The measurement tool 186 may be initiated, or started, in response to a trigger event, such as a predetermined time period, a randomized time period, a CPU utilization metric, data throughput metric, a change in network access method, e.g., wired access to wireless access, a change in Quality of Service (QoS), a request to change a user profile, a request to change a process location within the memory stack, or a request to change a network slice, e.g., network slice 128 in the 5G core network 122, or network slice 136 in the cloud network 130. The measurement tool 186 may perform a second measurement of the monitoring tool 188 and save the measurement to a location in the memory stack, for example, memory stack location 180. The second measurement of the process may follow the same steps previously described. The measurement tool 186 can compare the second measurement, located in memory stack location 180, to the first measurement, located in memory stack location 176, and activate a second monitoring tool if the comparison exceeds a threshold value. The second monitoring tool can compare the changes in the monitoring tool 188 located in memory stack location 176 to a black list signature file and stop the execution of the monitoring tool 188. The second monitoring tool can alert the user of a corrupted monitoring tool 188. The second monitoring tool may hibernate one or more active processes, for example, may hibernate a hard drive to prevent encryption of the hard drive.

The term CPU utilization is the usage of the CPU processing resources, for example, 100% utilization means that all CPU processing resources are being utilized as the processor executes. The term data throughput can refer to the transfer of data from non-transitory memory 170 through the CPU to a network connectivity device, e.g., network connectivity device 392 in FIG. 12, or to a secondary storage device, e.g., secondary storage 384 in FIG. 12. The phrase "a change in access" can refer to the network connectivity device, e.g., 392 in FIG. 12, switching from wired communication, e.g., Internet protocol (IP), to a wireless communication, e.g., WiFi (IEEE 802.11), or switching to any other method. QoS is a description or measurement of quality of service such as packet loss, bit rate, data throughput, transmission delay, availability, and jitter, of a computer network, e.g., network 140, a Cloud network, e.g., Cloud network 130, or a mobile network, e.g., 5G core network 122.

Although the binary and the disassembled binary is described as being saved to a location within the memory stack, it is understood that other storage locations may be utilized including storage hardware, such as solid state drives and hard drives. The non-transitory memory 170 may be located in a mobile device, e.g., UE 102, a computer system, e.g., UE 142, one or more servers within a mobile network, e.g., 5G core network 122, or one or more servers within a cloud network, e.g., cloud network 130.

Figure 3:
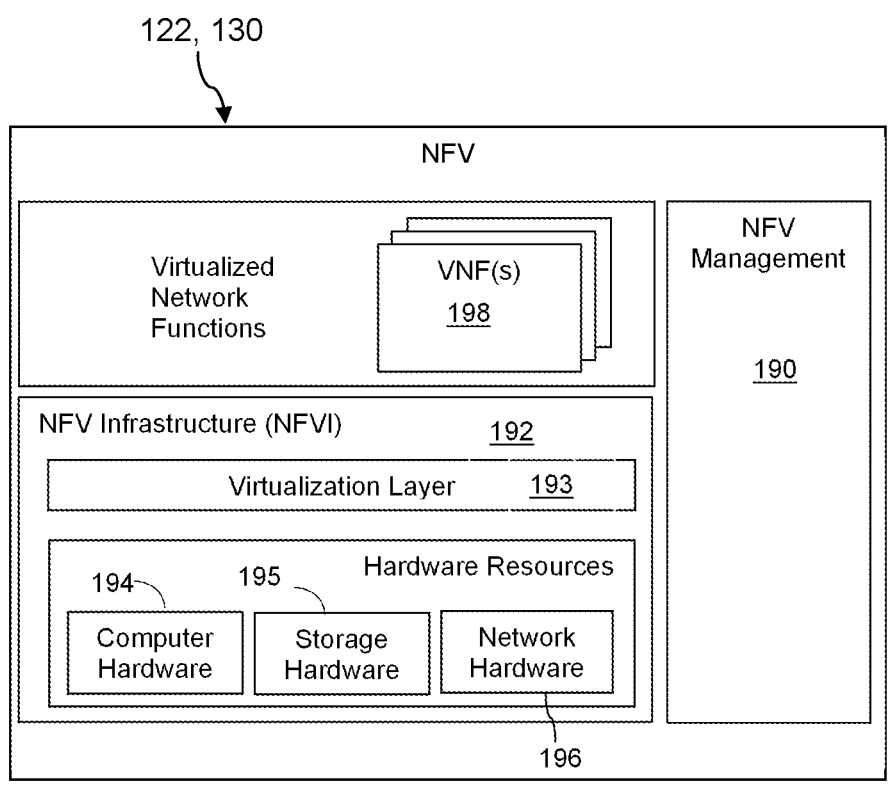
FIG. 3 is a block diagram of a 5G network function virtualization according to an embodiment of the disclosure.

The interaction of the measurement tool 186 and the monitoring tool within network computing services based on virtualized environment, e.g., cloud networks, can be illustrated by a Network Function Virtualization (NFV). Although the architecture of various cloud computing platform may vary, the basics structure of standardized server equipment creating a virtual environment that can emulate any software environment with one or more Virtualized Network Functions (VNF) remains the same. Turning now to FIG. 3, the NFV architecture is shown. The NFV, e.g., 5G core network 122 and cloud network 130, may use off the shelf hardware resources for the computer hardware 194, storage hardware 195, and network hardware 196. In an embodiment, the OS 172 illustrated in FIG. 2 with the measurement tool 186 and the monitoring tool 188, may be installed on the computer hardware 194. The measurement tool 186 may be measuring the kernel 174, the processes executing in the memory stack locations 176-184, and the monitoring tool 188 within the computer hardware 194 of the NFV, e.g., 5G core network 122 and cloud network 130.

In an embodiment, the OS 172 illustrated in FIG. 2 with the measurement tool 186 and the monitoring tool 188, may be installed within one or more VNF 198 within a network slice 128 on 5G core network or within a network slice 136 on cloud network 130. Although the OS 172 is executing within one or more VNF 198, it is understood that the OS 172 may be executing within the computer hardware 194 via the hypervisor, e.g., the virtualization layer 193 and the NFV management 190. The measurement tool 186 may be measuring the kernel 174 executing within VNF, the processes executing in the VNF, and the monitoring tool 188 within the VNF 198 within the network slice 128 or network slice 136.

The NFV, e.g., 5G core network 122 and cloud network 130, can comprise the NFV management 190, NFV infrastructure 192, and virtualized network functions (VNF) 198. NFV management 190 can control the lifecycle management of one or more VNFs 198. The lifecycle management can include the creation, management, and dissolution of the VNFs 198. The one or more VNFs 198 include the software implementations of a network function that a computing service may execute within. The NFV infrastructure 192 includes computer hardware 194, storage hardware 195, network hardware 196, and a virtualization layer 193. The computer hardware 194 can include single or multiple commercial servers. The storage hardware 195 can include standard hard-drives, solid-state drives, optical storage devices, or any combination thereof. The network hardware 196 can comprise various commercial routers and switch hardware. The virtualization layer 193 decouples the hardware resources (i.e., computing hardware 194, storage hardware 195, and network hardware 196) by abstracting the hardware resources as software functions. The virtualization layer 193 offers standardized interfaces so that the VNF performance can be independent of the hardware resources. The NFV, e.g., cloud network 130, creates a VNF environment that can support computing services regardless of the platform or operating system needed for the computing service. The cloud network 130 and the 5G core network 122 can be structurally identical, however 5G core network 122 can have computer hardware 194, storage hardware 195, and network hardware 196 of a different type than cloud network 130 and subsequently 5G core network 122 can have a different computing capacity than cloud network 130. Network function virtualization (NFV) is more fully described by ETSI GS NFV 002 v1.2.1 (2014-12) described in more detail further hereinafter.

Figure 4:
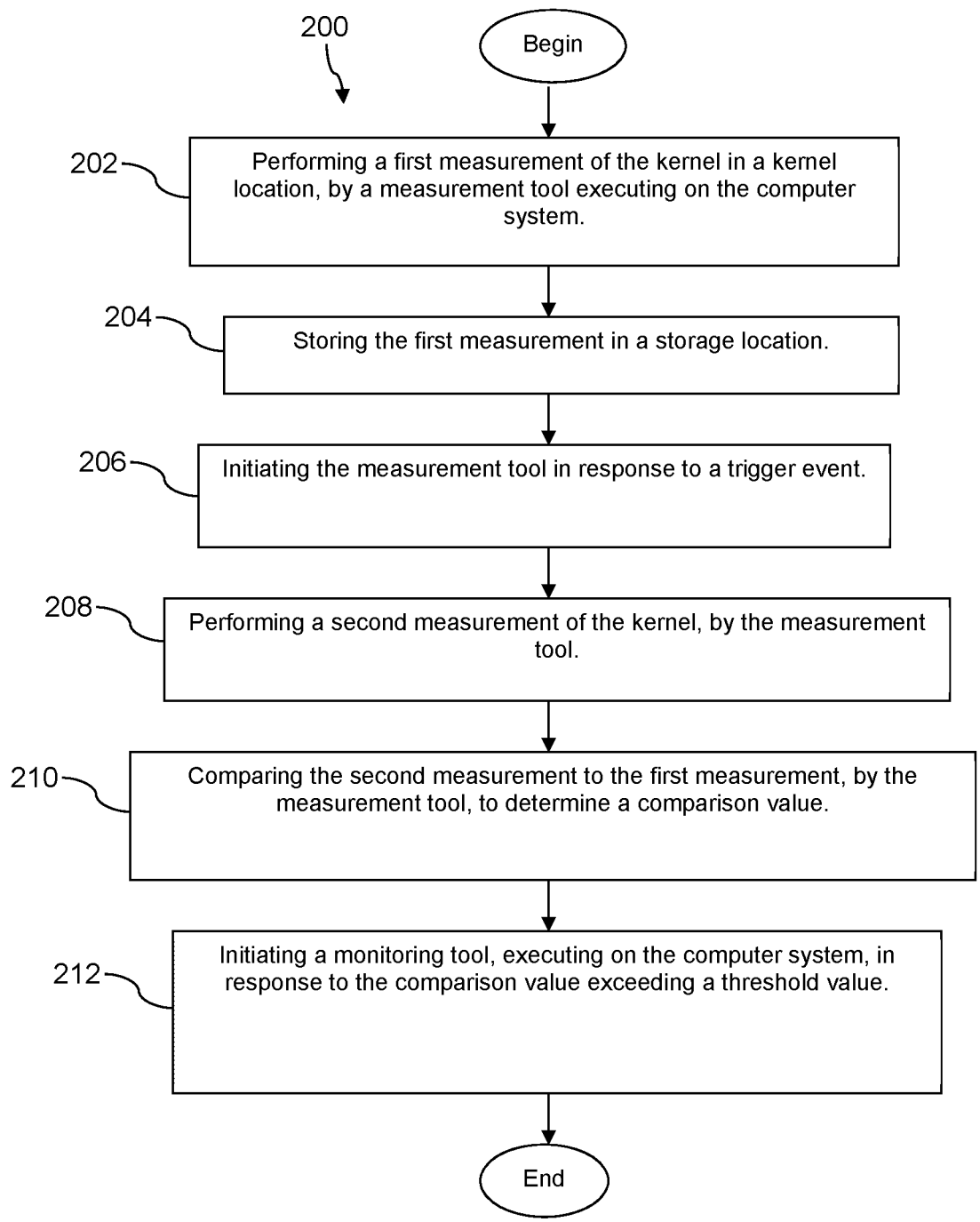
FIG. 4 is a flow chart of a method according to an embodiment of the disclosure.

Turning now to FIG. 4, a method 200 is described. In an embodiment, the method 200 is a method of detecting an initiation of malware code within a kernel of a computer system. At block 202, the method 200 comprises performing a first measurement of the kernel in a kernel location, by a measurement tool executing on the computer system.

At block 204, the method 200 comprises storing the first measurement in a storage location. At block 206, the method 200 comprises initiating the measurement tool in response to a trigger event. At block 208, the method 200 comprises performing a second measurement of the kernel, by the measurement tool.

At block 210, the method 200 comprises comparing the second measurement to the first measurement, by the measurement tool, to determine a comparison value. At block 212, the method 200 comprises initiating a monitoring tool, executing on the computer system, in response to the comparison value exceeding a threshold value.

Figure 5:
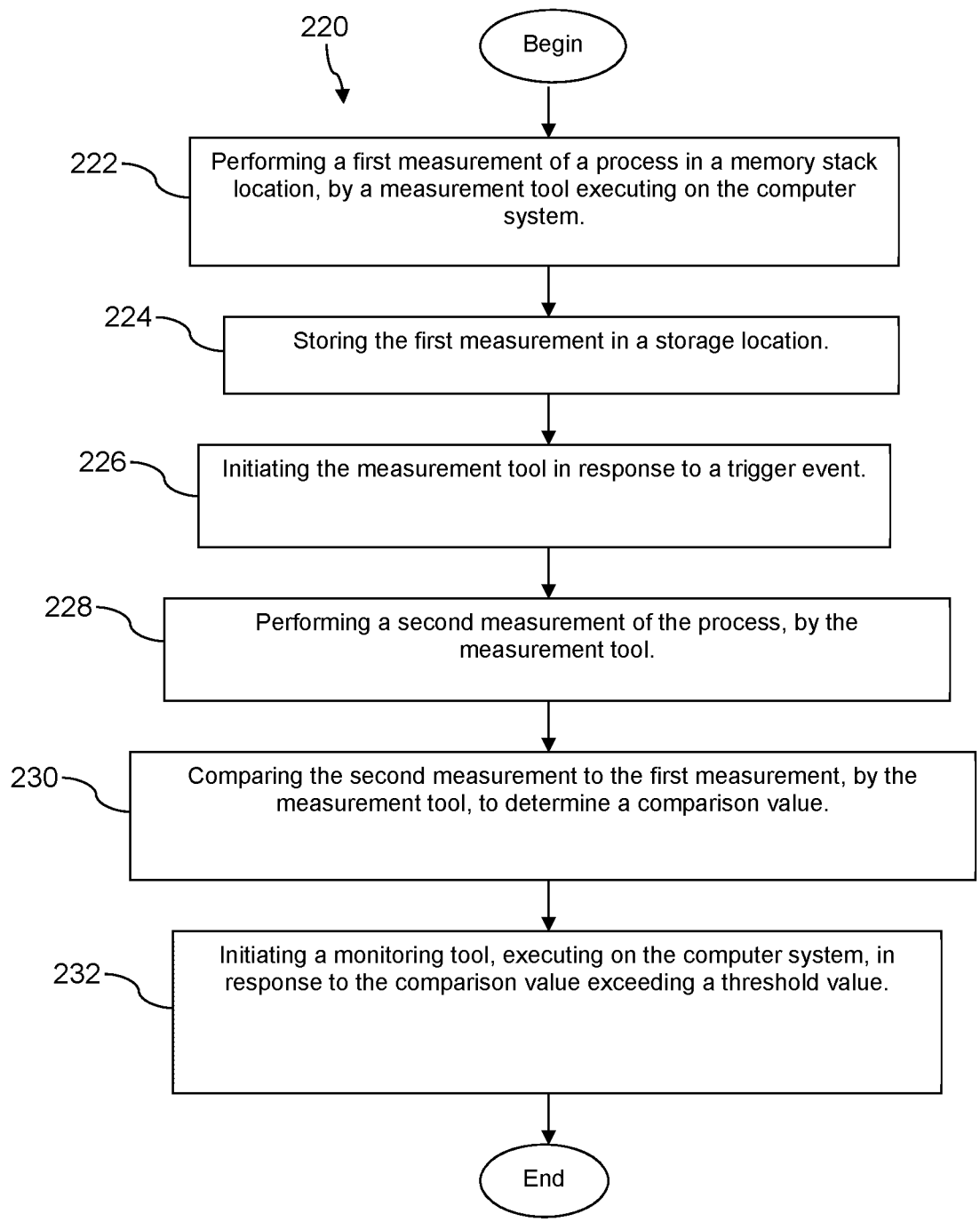
FIG. 5 is a flow chart of another method according to an embodiment of the disclosure.

Turning now to FIG. 5, a method 220 is described. In an embodiment, the method 220 is a method of detecting an initiation of malware code within a memory stack of non-transitory memory of a computer system. At block 222, the method 220 comprises performing a first measurement of a process in a memory stack location, by a measurement tool executing on the computer system.

At block 224, the method 220 comprises storing the first measurement in a storage location. At block 226, the method 220 comprises initiating the measurement tool in response to a trigger event. At block 228, the method 220 comprises performing a second measurement of the process, by the measurement tool.

At block 230, the method 220 comprises comparing the second measurement to the first measurement by the measurement tool to determine a comparison value. At block 232, the method 220 comprises initiating a monitoring tool, executing on the computer system, in response to the comparison value exceeding a threshold value.

Figure 6:
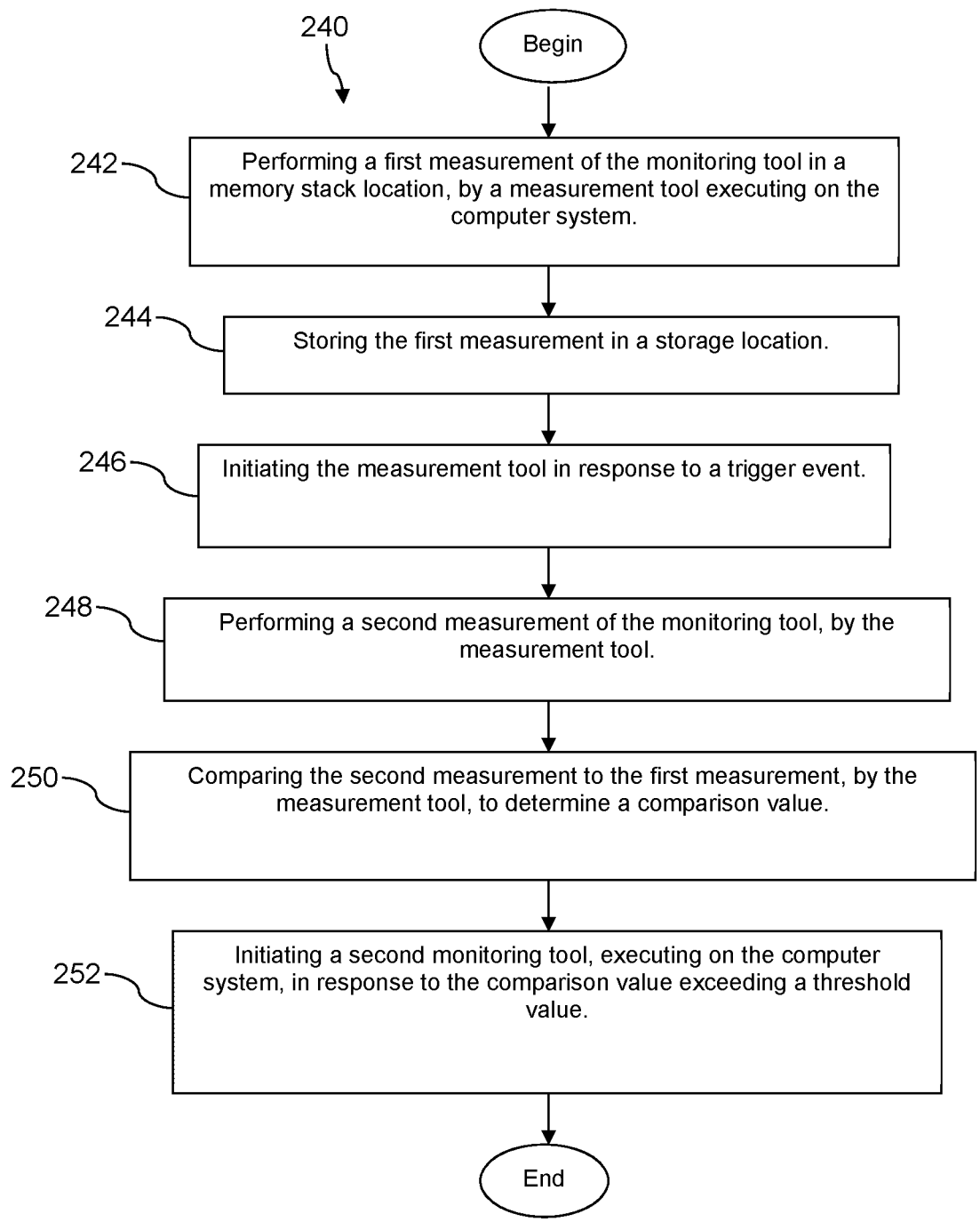
FIG. 6 is a flow chart of yet another method according to an embodiment of the disclosure.

Turning now to FIG. 6, a method 240 is described. In an embodiment, the method 240 is a method of detecting the initiation of malware code within a monitoring tool of a computer system. At block 242, the method 240 comprises performing a first measurement of the monitoring tool in a memory stack location, by a measurement tool executing on the computer system.

At block 244, the method 240 comprises storing the first measurement in a storage location. At block 246, the method 240 comprises initiating the measurement tool in response to a trigger event. At block 248, the method 240 comprises performing a second measurement of the monitoring tool, by the measurement tool.

At block 250, the method 240 comprises comparing the second measurement to the first measurement, by the measurement tool, to determine a comparison value. At block 252, the method 240 comprises initiating a second monitoring tool, executing on the computer system, in response to the comparison value exceeding a threshold value.

Figure 7:
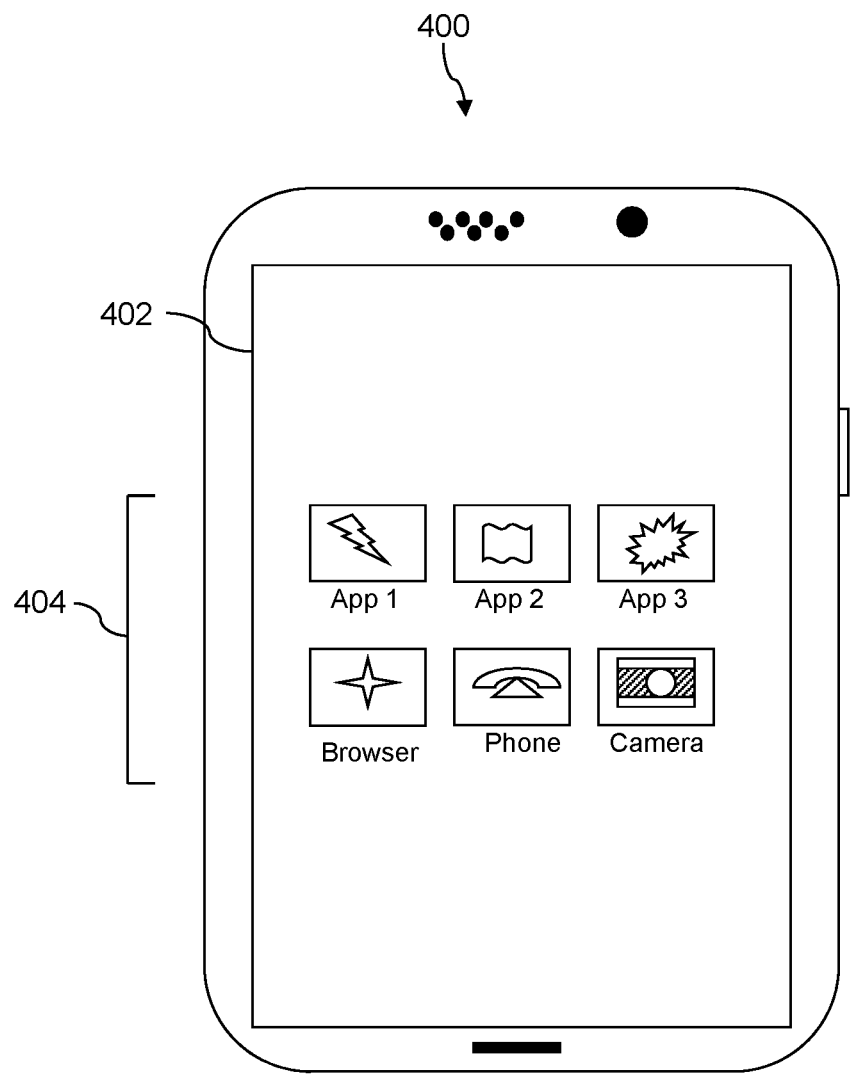
FIG. 7 is an illustration of a mobile communication device according to an embodiment of the disclosure.

FIG. 7 depicts the user equipment (UE) 400, which is operable for implementing aspects of the present disclosure, but the present disclosure should not be limited to these implementations. Though illustrated as a mobile phone, the UE 400 may take various forms including a wireless handset, a pager, a personal digital assistant (PDA), a gaming device, or a media player. The UE 400 includes a touchscreen display 402 having a touch-sensitive surface for input by a user. A small number of application icons 404 are illustrated within the touch screen display 402. It is understood that in different embodiments, any number of application icons 404 may be presented in the touch screen display 402. In some embodiments of the UE 400, a user may be able to download and install additional applications on the UE 400, and an icon associated with such downloaded and installed applications may be added to the touch screen display 402 or to an alternative screen. The UE 400 may have other components such as electro-mechanical switches, speakers, camera lenses, microphones, input and/or output connectors, and other components as are well known in the art. The UE 400 may present options for the user to select, controls for the user to actuate, and/or cursors or other indicators for the user to direct. The UE 400 may further accept data entry from the user, including numbers to dial or various parameter values for configuring the operation of the handset. The UE 400 may further execute one or more software or firmware applications in response to user commands. These applications may configure the UE 400 to perform various customized functions in response to user interaction. Additionally, the UE 400 may be programmed and/or configured over-the-air, for example from a wireless base station, a wireless access point, or a peer UE 400. The UE 400 may execute a web browser application which enables the touch screen display 402 to show a web page. The web page may be obtained via wireless communications with a base transceiver station, a wireless network access node, a peer UE 400 or any other wireless communication network or system.

Figure 8:
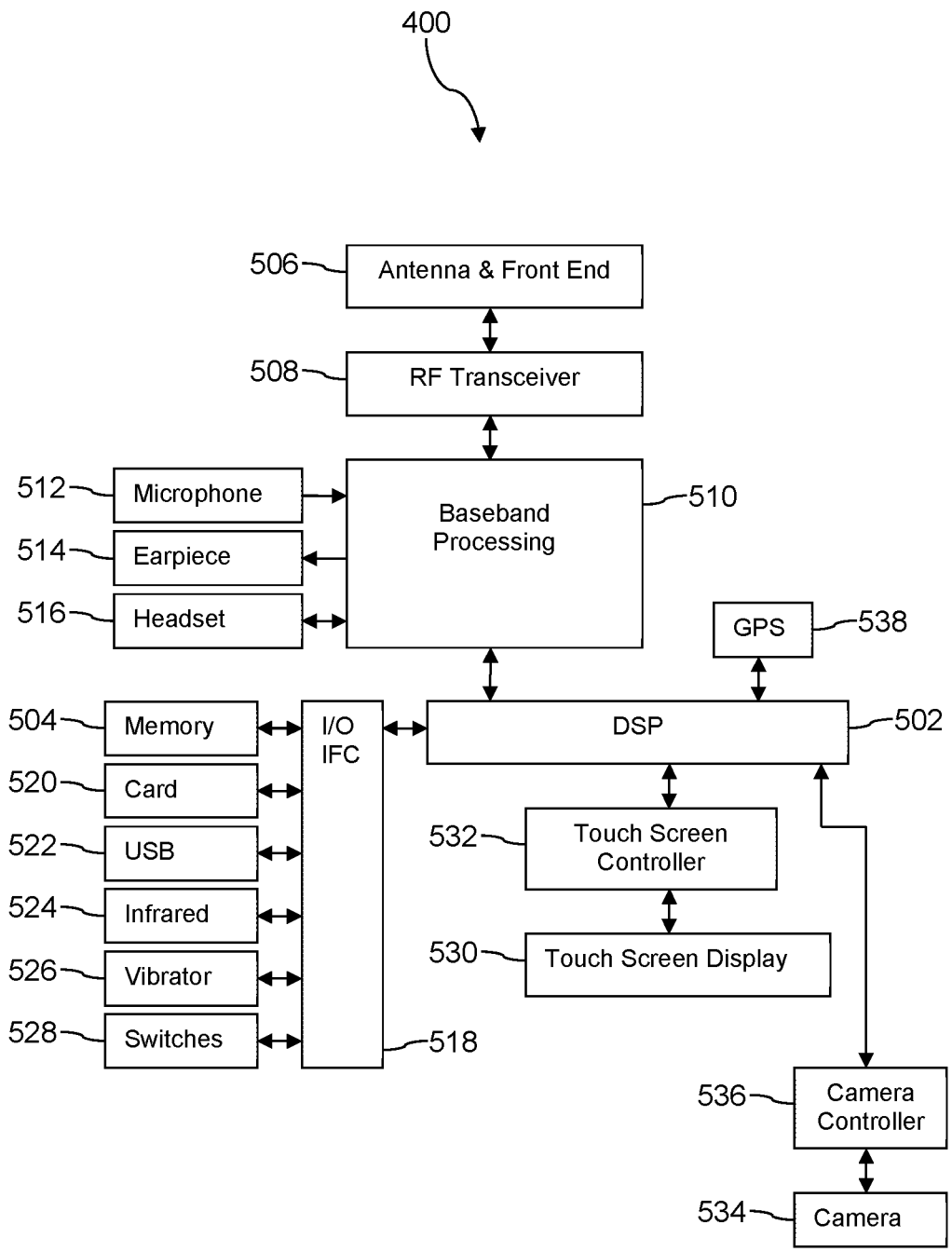
FIG. 8 is a block diagram of a hardware architecture of a mobile communication device according to an embodiment of the disclosure.

FIG. 8 shows a block diagram of the UE 400. While a variety of known components of handsets are depicted, in an embodiment a subset of the listed components and/or additional components not listed may be included in the UE 400. The UE 400 includes a digital signal processor (DSP) 502 and a memory 504. As shown, the UE 400 may further include one or more antenna and front end unit 506, a one or more radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, one or more electro-mechanical switches 528, a touch screen display 530, a touch screen controller 532, a camera 534, a camera controller 536, and a global positioning system (GPS) receiver 538. In an embodiment, the UE 400 may include another kind of display that does not provide a touch sensitive screen. In an embodiment, the UE 400 may include both the touch screen display 530 and additional display component that does not provide a touch sensitive screen. In an embodiment, the DSP 502 may communicate directly with the memory 504 without passing through the input/output interface 518. Additionally, in an embodiment, the UE 400 may comprise other peripheral devices that provide other functionality.

The DSP 502 or some other form of controller or central processing unit operates to control the various components of the UE 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 400 to function as a peripheral device to exchange information with a personal computer or other computer system. The infrared port 524 and other optional ports such as a Bluetooth® interface or an IEEE 802.11 compliant wireless interface may enable the UE 400 to communicate wirelessly with other nearby handsets and/or wireless base stations.

In an embodiment, one or more of the radio transceivers is a cellular radio transceiver. A cellular radio transceiver promotes establishing a wireless communication link with a cell site according to one or more of a 5G, a long term evolution (LTE), a code division multiple access (CDMA), a global system for mobile communications (GSM) wireless communication protocol. In an embodiment, one of the radio transceivers 508 may comprise a near field communication (NFC) transceiver. The NFC transceiver may be used to complete payment transactions with point-of-sale terminals or other communications exchanges. In an embodiment, each of the different radio transceivers 508 may be coupled to its own separate antenna. In an embodiment, the UE 400 may comprise a radio frequency identify (RFID) reader and/or writer device.

The switches 528 may couple to the DSP 502 via the input/output interface 518 to provide one mechanism for the user to provide input to the UE 400. Alternatively, one or more of the switches 528 may be coupled to a motherboard of the UE 400 and/or to components of the UE 400 via a different path (e.g., not via the input/output interface 518), for example coupled to a power control circuit (power button) of the UE 400. The touch screen display 530 is another input mechanism, which further displays text and/or graphics to the user. The touch screen LCD controller 532 couples the DSP 502 to the touch screen display 530. The GPS receiver 538 is coupled to the DSP 502 to decode global positioning system signals, thereby enabling the UE 400 to determine its position.

Figure 9A:
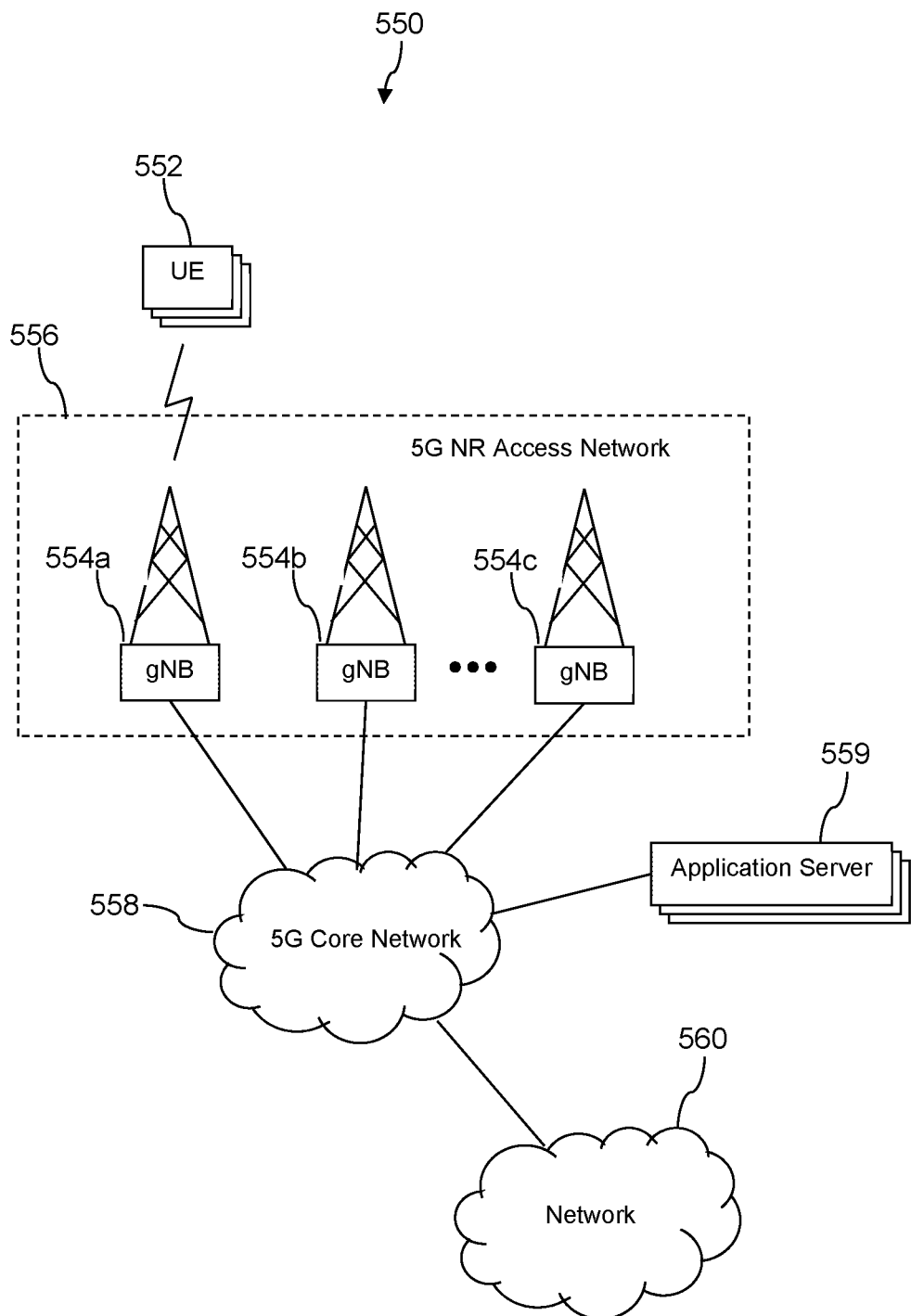
FIG. 9A is a block diagram of an exemplary communication system according to an embodiment of the disclosure.

Turning now to FIG. 9A, an exemplary communication system 550 is described. Typically, the communication system 550 includes a number of access nodes 554 that are configured to provide coverage in which UEs 552 such as cell phones, tablet computers, machine-type-communication devices, tracking devices, embedded wireless modules, and/or other wirelessly equipped communication devices (whether or not user operated), can operate. The access nodes 554 may be said to establish an access network 556. The access network 556 may be referred to as a radio access network (RAN) in some contexts. In a 5G technology generation an access node 554 may be referred to as a gigabit Node B (gNB). In 4G technology (e.g., long term evolution (LTE) technology) an access node 554 may be referred to as an evolved Node B (eNB). In 3G technology (e.g., code division multiple access (CDMA) and global system for mobile communication (GSM)) an access node 554 may be referred to as a base transceiver station (BTS) combined with a base station controller (BSC). In some contexts, the access node 554 may be referred to as a cell site or a cell tower. In some implementations, a picocell may provide some of the functionality of an access node 554, albeit with a constrained coverage area. Each of these different embodiments of an access node 554 may be considered to provide roughly similar functions in the different technology generations.

In an embodiment, the access network 556 comprises a first access node 554a, a second access node 554b, and a third access node 554c. It is understood that the access network 556 may include any number of access nodes 554. Further, each access node 554 could be coupled with a core network 558 that provides connectivity with various application servers 559 and/or a network 560. In an embodiment, at least some of the application servers 559 may be located close to the network edge (e.g., geographically close to the UE 552 and the end user) to deliver so-called "edge computing." The network 560 may be one or more private networks, one or more public networks, or a combination thereof. The network 560 may comprise the public switched telephone network (PSTN). The network 560 may comprise the Internet. With this arrangement, a UE 552 within coverage of the access network 556 could engage in air-interface communication with an access node 554 and could thereby communicate via the access node 554 with various application servers and other entities.

The communication system 550 could operate in accordance with a particular radio access technology (RAT), with communications from an access node 554 to UEs 552 defining a downlink or forward link and communications from the UEs 552 to the access node 554 defining an uplink or reverse link. Over the years, the industry has developed various generations of RATs, in a continuous effort to increase available data rate and quality of service for end users. These generations have ranged from "1G," which used simple analog frequency modulation to facilitate basic voice-call service, to "4G"— such as Long Term Evolution (LTE), which now facilitates mobile broadband service using technologies such as orthogonal frequency division multiplexing (OFDM) and multiple input multiple output (MIMO).

Recently, the industry has been exploring developments in "5G" and particularly "5G NR" (5G New Radio), which may use a scalable OFDM air interface, advanced channel coding, massive MIMO, beamforming, mobile mmWave (e.g., frequency bands above 24 GHz), and/or other features, to support higher data rates and countless applications, such as mission-critical services, enhanced mobile broadband, and massive Internet of Things (I). 5G is hoped to provide virtually unlimited bandwidth on demand, for example providing access on demand to as much as 20 gigabits per second (Gbps) downlink data throughput and as much as 10 Gbps uplink data throughput. Due to the increased bandwidth associated with 5G, it is expected that the new networks will serve, in addition to conventional cell phones, general internet service providers for laptops and desktop computers, competing with existing ISPs such as cable internet, and also will make possible new applications in internet of things (IoT) and machine to machine areas.

In accordance with the RAT, each access node 554 could provide service on one or more radio-frequency (RF) carriers, each of which could be frequency division duplex (FDD), with separate frequency channels for downlink and uplink communication, or time division duplex (TDD), with a single frequency channel multiplexed over time between downlink and uplink use. Each such frequency channel could be defined as a specific range of frequency (e.g., in radio-frequency (RF) spectrum) having a bandwidth and a center frequency and thus extending from a low-end frequency to a high-end frequency. Further, on the downlink and uplink channels, the coverage of each access node 554 could define an air interface configured in a specific manner to define physical resources for carrying information wirelessly between the access node 554 and UEs 552.

Without limitation, for instance, the air interface could be divided over time into frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval (TTI), the resource elements on the downlink and uplink could be grouped to define physical resource blocks (PRBs) that the access node could allocate as needed to carry data between the access node and served UEs 552.

In addition, certain resource elements on the example air interface could be reserved for special purposes. For instance, on the downlink, certain resource elements could be reserved to carry synchronization signals that UEs 552 could detect as an indication of the presence of coverage and to establish frame timing, other resource elements could be reserved to carry a reference signal that UEs 552 could measure in order to determine coverage strength, and still other resource elements could be reserved to carry other control signaling such as PRB-scheduling directives and acknowledgement messaging from the access node 554 to served UEs 552. And on the uplink, certain resource elements could be reserved to carry random access signaling from UEs 552 to the access node 554, and other resource elements could be reserved to carry other control signaling such as PRB-scheduling requests and acknowledgement signaling from UEs 552 to the access node 554

The access node 554, in some instances, may be split functionally into a radio unit (RU), a distributed unit (DU), and a central unit (CU) where each of the RU, DU, and CU have distinctive roles to play in the access network 556. The RU provides radio functions. The DU provides L1 and L2 real-time scheduling functions; and the CU provides higher L2 and L3 non-real time scheduling. This split supports flexibility in deploying the DU and CU. The CU may be hosted in a regional cloud data center. The DU may be co-located with the RU, or the DU may be hosted in an edge cloud data center.

Figure 9B:
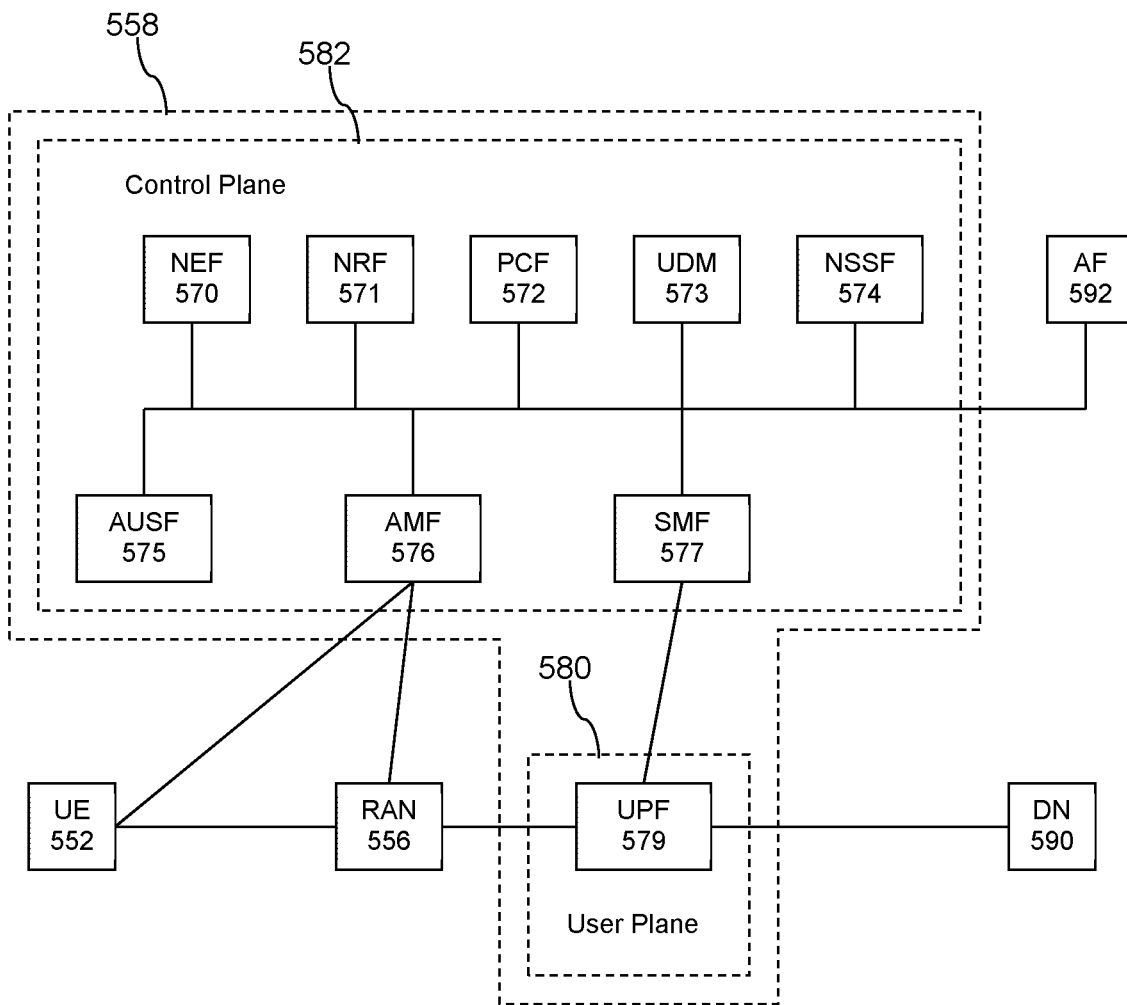
FIG. 9B is a block diagram of a 5G core network according to an embodiment of the disclosure.

Turning now to FIG. 9B, further details of the core network 558 are described. In an embodiment, the core network 558 is a 5G core network. 5G core network technology is based on a service based architecture paradigm. Rather than constructing the 5G core network as a series of special purpose communication nodes (e.g., an HSS node, a MME node, etc.) running on dedicated server computers, the 5G core network is provided as a set of services or network functions. These services or network functions can be executed on virtual servers in a cloud computing environment which supports dynamic scaling and avoidance of long-term capital expenditures (fees for use may substitute for capital expenditures). These network functions can include, for example, a user plane function (UPF) 579, an authentication server function (AUSF) 575, an access and mobility management function (AMF) 576, a session management function (SMF) 577, a network exposure function (NEF) 570, a network repository function (NRF) 571, a policy control function (PCF) 572, a unified data management (UDM) 573, a network slice selection function (NSSF) 574, and other network functions. The network functions may be referred to as virtual network functions (VNFs) in some contexts.

Network functions may be formed by a combination of small pieces of software called microservices. Some microservices can be re-used in composing different network functions, thereby leveraging the utility of such microservices. Network functions may offer services to other network functions by extending application programming interfaces (APIs) to those other network functions that call their services via the APIs. The 5G core network 558 may be segregated into a user plane 580 and a control plane 582, thereby promoting independent scalability, evolution, and flexible deployment.

The UPF 579 delivers packet processing and links the UE 552, via the access network 556, to a data network 590 (e.g., the network 560 illustrated in FIG. 6A). The AMF 576 handles registration and connection management of non-access stratum (NAS) signaling with the UE 552. Said in other words, the AMF 576 manages UE registration and mobility issues. The AMF 576 manages reachability of the UEs 552 as well as various security issues. The SMF 577 handles session management issues. Specifically, the SMF 577 creates, updates, and removes (destroys) protocol data unit (PDU) sessions and manages the session context within the UPF 579. The SMF 577 decouples other control plane functions from user plane functions by performing dynamic host configuration protocol (DHCP) functions and IP address management functions. The AUSF 575 facilitates security processes.

The NEF 570 securely exposes the services and capabilities provided by network functions. The NRF 571 supports service registration by network functions and discovery of network functions by other network functions. The PCF 572 supports policy control decisions and flow based charging control. The UDM 573 manages network user data and can be paired with a user data repository (UDR) that stores user data such as customer profile information, customer authentication number, and encryption keys for the information. An application function 592, which may be located outside of the core network 558, exposes the application layer for interacting with the core network 558. In an embodiment, the application function 592 may be execute on an application server 559 located geographically proximate to the UE 552 in an "edge computing" deployment mode. The core network 558 can provide a network slice to a subscriber, for example an enterprise customer, that is composed of a plurality of 5G network functions that are configured to provide customized communication service for that subscriber, for example to provide communication service in accordance with communication policies defined by the customer. The NSSF 574 can help the AMF 576 to select the network slice instance (NSI) for use with the UE 552.

Figure 10:
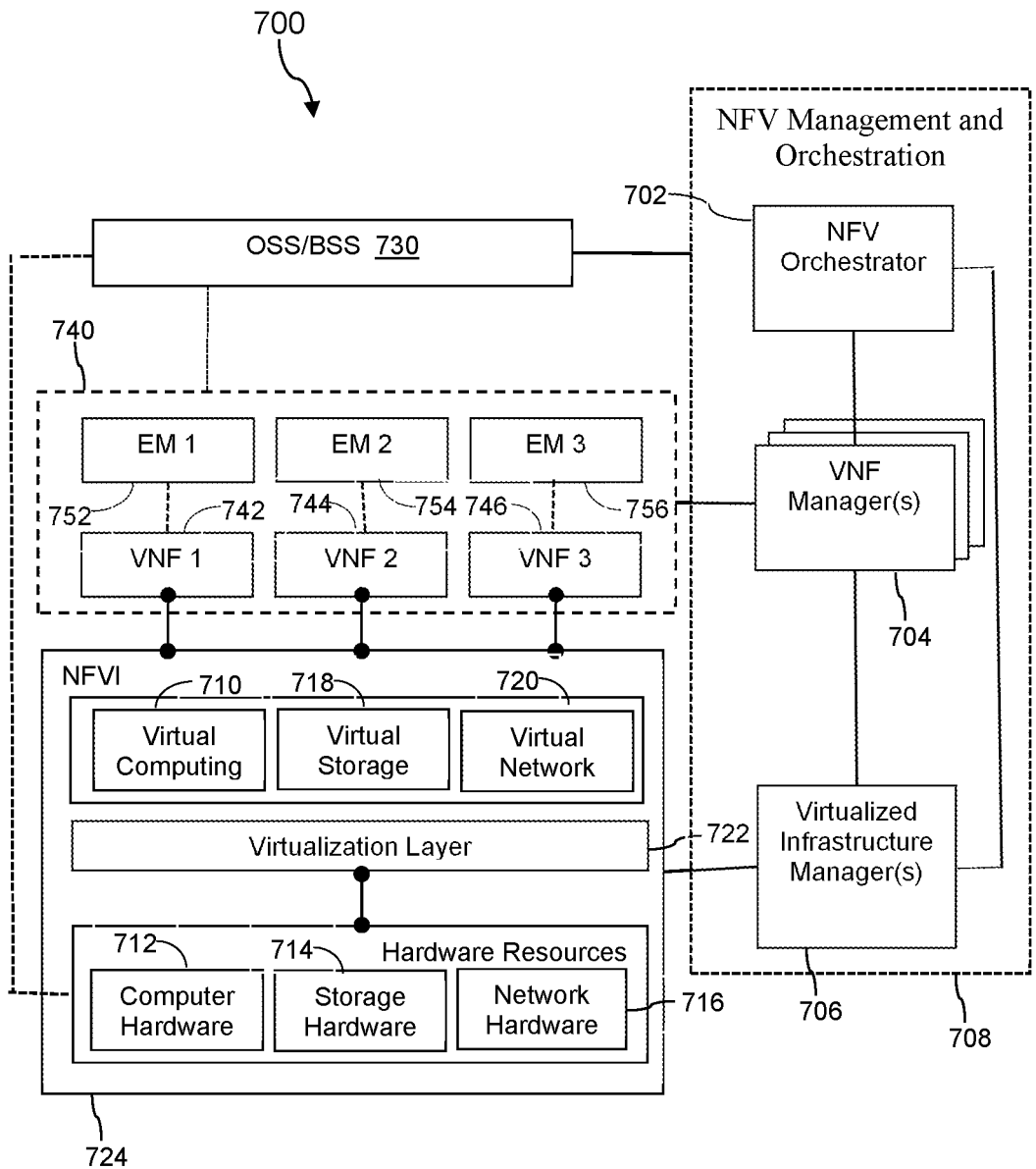
FIG. 10 is a block diagram of a network function virtualization according to an embodiment of the disclosure.

FIG. 10 illustrates an NFV system 700 for use in various embodiments of the disclosed systems and methods. NFV system architecture is well understood and described in Network Functions Virtualization (NFV); Architectural Framework ETSI GS NFV 002 V1.2.1 (2014-12), which is incorporated into this description. The NFV system 700 can comprise an NFV Infrastructure (NFVI) entity 724, a virtual function entity 740, NFV Management and Orchestration 708, and an Operations Support Systems (OSS) and Business Support Systems (BSS) generally referred to as OSS/BSS 730 suitable for implementing one or more embodiments disclosed herein.

The NFVI 724 is the hardware and software components that comprise the environment in which VNFs (e.g., VNF 742, 744, and 746) are deployed, managed, and executed. The NFVI 724 can be located in one location or can be communicatively connected to multiple locations. For example, the NFVI 724 can be located on several floors of a building or across several buildings on campus. The network providing connectivity between those locations comprises part of the NFV Infrastructure. The NFVI 724 includes off-the-shelf (OTS) hardware resources of computing hardware 712, storage hardware 714, and network hardware 716. The computing hardware 712 can be OTS instead of purpose-built hardware. The storage hardware 714 can comprise network attached storage (NAS) and storage that resides on the computing hardware 712. The storage hardware 714 can include standard hard-drives, solid-state drives, optical storage devices, or any combination thereof. Network hardware 716 is comprised of switching functions, e.g., routers, and wired or wireless links. Network hardware 716 can also provide resources that span different domains. In NFVI 724, the computing hardware 712, storage hardware 714, and network hardware 716 are pooled together through the virtualization layer 722 (e.g., hypervisor).

The virtualization layer 722 within the NFVI 724 can abstract the computing hardware 712, storage hardware 714, and network hardware 716 and decouple the VNF functions 742, 744, and 746 from the computing hardware 712, storage hardware 714, and network hardware 716. For example, the virtualization layer 722 may be responsible for abstracting and logically partitioning computer the computing hardware 712, storage hardware 714, and network hardware 716, enabling the software that implements the VNF functions to use the underlying virtualized infrastructure, and providing virtualized resources to each of the VNF functions 742, 744, and 746. The virtualized resources controlled by the virtualization layer 722 may include a virtual computing 710, a virtual storage 718, and a virtual network 720.

The NFV Management and Orchestration 708 can manage the operation and coordination of VNF function 742, 744, and 746 and the respective NFVI entity 724. The NFV Management and Orchestration 708 can comprise an NFV Orchestrator (NFVO) 702, one or more VNF managers (VNFM) 704, and one or more Virtualized Infrastructure Manager (VIM) 706. The NFVO 702 can manage the network service (NS) lifecycle and coordinates the management of the NS lifecycle, VNF lifecycle through the VNFM 704, and NFVI resources through the VIM 706. The NFVO 702 operates to ensure the allocation of the necessary resources and connectivity for the VNF functions 742, 744, and 746 is optimized. The VNFM 704 can coordinate the VNF function 742, 744, and 746 lifecycle management (e.g., initiation, update, scaling, and termination). For example, in some configurations a separate VNFM 704 may be deployed for each VNF function 742, 744, and 746. In other configurations, a VNFM 704 may serve multiple VNF functions 742, 744, and 746. The VIM 706 can control and manage the NFVI 724 hardware resources. In other words, the VIM 706 can control and manage the virtualization layer 722 to provide virtual computing 710, virtual storage 718, and virtual network 720 resources to the VNF functions 742, 744, and 746 from the computer hardware 712, storage hardware 714, and network hardware 716. The VIM 706 and the VNFM 704 may coordinate to provide the resource allocation to the VNF functions 742, 744, and 746 by modifying the virtualized hardware resource configuration and state information.

The OSS/BSS 730 can coordinate the communication between NFV management and orchestration 708, NFVI 724, and virtual function entity 740. The OSS/BSS 730 can communicate the computing capacity of the NFVI 724 to VNFM 704 and VIM 706 within NFV management and orchestration 708. The OSS/BSS can coordinate the lifecycle management of the VNF functions 742, 744, and 746 with the NFVI 724 and the VNFM 704.

The virtual function entity 740 can comprise a plurality of VNF functions 742, 744, and 746, a plurality of element management (EM) systems 752, 754, and 756 that can be configured to perform the typical management functionality for the plurality of VNF functions 742, 744, and 746. Although three VNF and EMS systems are illustrated in FIG. 10, any number of these functions and systems may be found virtual function entity 740. It is also understood that alternate configurations of the VNF functions and element management systems may be contemplated within ETSI GS NFV 002 V1.2.1 (2014-12).

The VNF functions 742, 744, and 746 can be a virtualization of a network function in a non-virtualized network. For example, the network functions in the non-virtualized network may be 3GPP Evolved Packet Core (EPC) network elements, e.g., Mobility Management Entity (MME), Serving Gateway (SGW), Packet Data Network Gateway (PGW); elements in a home network, e.g., Residential Gateway (RGW); and conventional network functions, e.g., Dynamic Host Configuration Protocol (DHCP) servers, firewalls, etc. For example, NFV 700 can be comprised of one or more internal components, called virtualized network function components (VNFCs). Each VNFC provides a defined sub-set of that VNF's functionality, with the main characteristic that a single instance of this component maps one-for-one against a single virtualization container. For example, one VNF can be deployed over multiple Virtual Machines (VMs), where each VM hosts a VNFC of the VNF. However, in some cases, the whole VNF can be deployed in a single VM as well. A VM may be virtualized computation environment that behaves like a physical computer or server, which has all its ingredients (processor, memory/storage, interfaces/ports) of a physical computer/server and is generated by a hypervisor, which partitions the underlying physical resources and allocates them to VMs. A hypervisor may be a piece of software which partitions the underlying physical resources and creates virtual machines and isolates the virtual machines from each other.

Figure 11A:
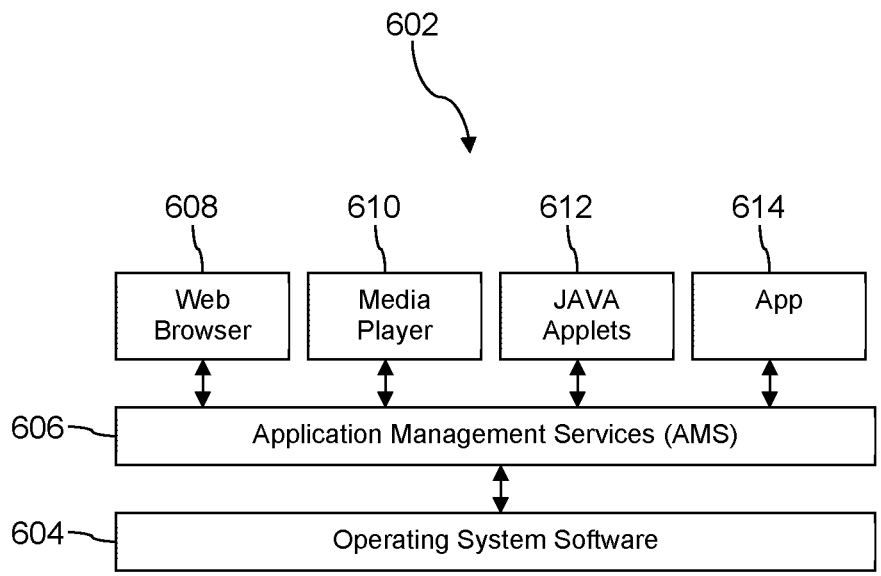
FIG. 11A is a block diagram of a software architecture of a mobile communication device according to an embodiment of the disclosure.

FIG. 11A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the UE 400. Also shown in FIG. 7A are a web browser application 608, a media player application 610, and JAVA applets 612. The web browser application 608 may be executed by the UE 400 to browse content and/or the Internet, for example when the UE 400 is coupled to a network via a wireless link. The web browser application 608 may permit a user to enter information into forms and select links to retrieve and view web pages. The media player application 610 may be executed by the UE 400 to play audio or audiovisual media. The JAVA applets 612 may be executed by the UE 400 to provide a variety of functionality including games, utilities, and other functionality.

Figure 11B:
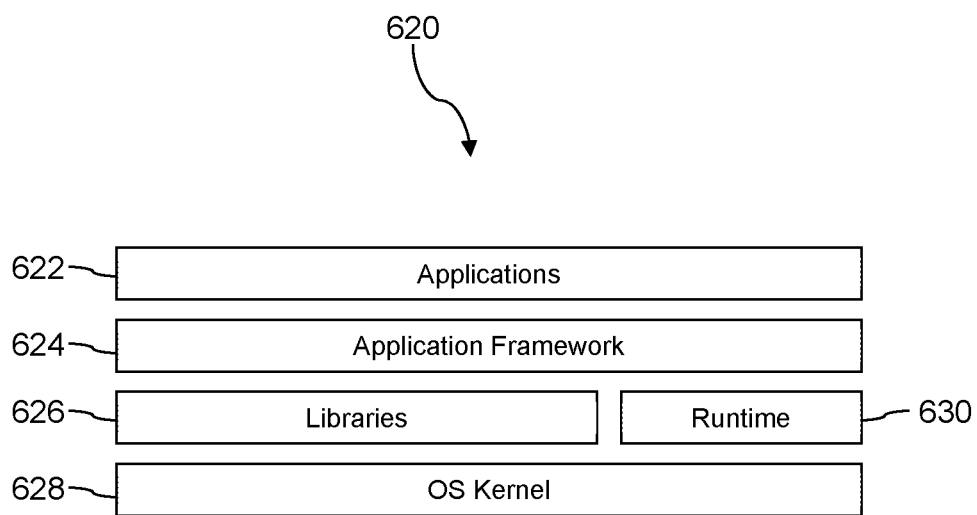
FIG. 11B is a block diagram of another software architecture of a mobile communication device according to an embodiment of the disclosure.

FIG. 11B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 12:
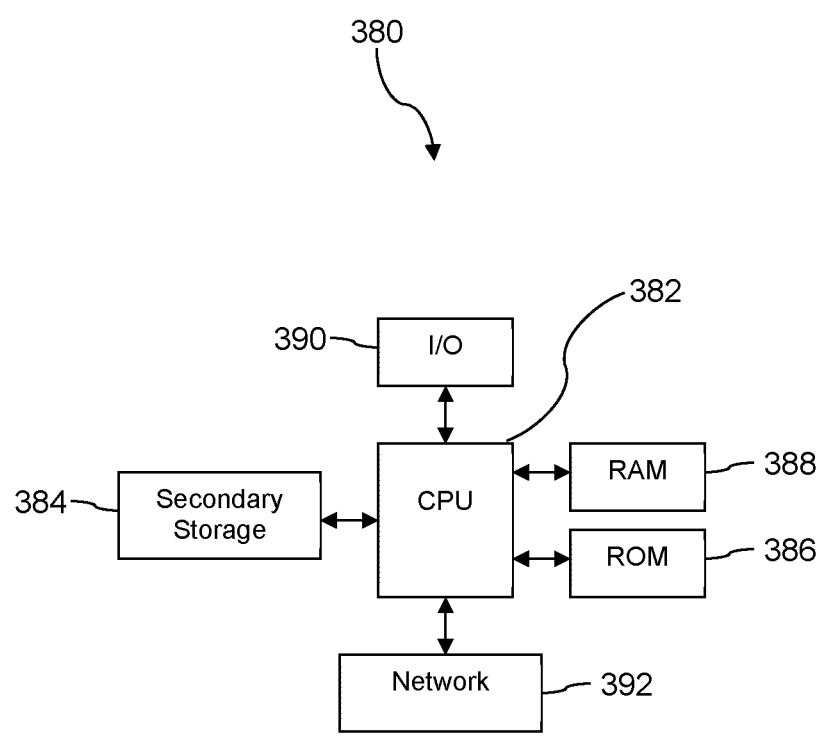
FIG. 12 is a block diagram of a computer system according to an embodiment of the disclosure.

FIG. 12 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the computer system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), and radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of detecting an initiation of malware code within a malware monitoring tool of a computer system, comprising:
   performing a first measurement of a first malware monitoring tool in a memory stack location, by a measurement tool executing on the computer system;
   storing the first measurement, by the measurement tool, in a storage location;
   initiating the measurement tool in response to a trigger event;
   performing a second measurement of the first malware monitoring tool, by the measurement tool;
   comparing the second measurement to the first measurement, by the measurement tool, to determine a comparison value;
   initiating a second malware monitoring tool, executing on the computer system, in response to the comparison value exceeding a threshold value;
   detecting a suspect process executing in a second memory stack location, by the second malware monitoring tool; and
   stopping the execution of the suspect process, by the second malware monitoring tool.

2. The method of claim 1, wherein the measurement of the first malware monitoring tool comprises recording a binary of the monitoring tool.

3. The method of claim 1, wherein the storage location is non-transitory memory, solid-state drive, or a hard drive.

4. The method of claim 1, wherein the memory stack location is one of i) a non-transitory memory of a User Equipment (UE), ii) a non-transitory memory of a computer system, iii) a non-transitory memory of a server, iv) a non-transitory memory of a virtualized network function, or v) combination thereof.

5. The method of claim 1, wherein the trigger event is one of i) a predetermined time period, ii) a randomized time period, iii) a processor utilization metric, iv) a data throughput metric, v) a change in network access method, vi) a change in QoS, vii) a request to change a user profile, viii) a request to change a process location within the memory stack, ix) a request to change a network slice, or x) combination thereof.

6. The method of claim 1, further comprising:
   comparing a characteristic of a monitoring tool, by the second malware monitoring tool, to a black list signature file;
   stopping the execution of the monitoring tool, by the second malware monitoring tool, in response to the characteristic of the monitoring tool matching a signature on the black list signature file; and
   alerting a user, by the second malware monitoring tool, the matching of the characteristic of the monitoring tool to the signature on the black list signature file.

* * * * *